United States Patent
Miyasaka et al.

(10) Patent No.: US 9,902,647 B2
(45) Date of Patent: Feb. 27, 2018

(54) MANUFACTURING METHOD FOR PHASE-SEPARATED GLASS, AND PHASE-SEPARATED GLASS

(71) Applicant: ASAHI GLASS COMPANY, LIMITED, Tokyo (JP)

(72) Inventors: Junko Miyasaka, Tokyo (JP); Seiki Ohara, Tokyo (JP); Takahiro Sakagami, Shizuoka (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/395,025

(22) Filed: Dec. 30, 2016

(65) Prior Publication Data

US 2017/0107142 A1    Apr. 20, 2017

Related U.S. Application Data

(60) Division of application No. 14/685,131, filed on Apr. 13, 2015, now Pat. No. 9,580,353, which is a
(Continued)

(30) Foreign Application Priority Data

Oct. 12, 2012  (JP) .................. 2012-226854

(51) Int. Cl.
*C03C 10/00* (2006.01)
*C03C 3/097* (2006.01)
(Continued)

(52) U.S. Cl.
CPC ............ *C03C 10/0045* (2013.01); *C03B 5/23* (2013.01); *C03C 3/097* (2013.01); *C03C 4/08* (2013.01);
(Continued)

(58) Field of Classification Search
CPC ...................................... C03C 4/005
(Continued)

(56) References Cited

U.S. PATENT DOCUMENTS 4,038,448 A * 7/1977 Boyd .................. C03C 4/005
428/212
4,053,679 A * 10/1977 Rinehart ............... C03C 3/062
428/218
(Continued)

FOREIGN PATENT DOCUMENTS

CN     101244889 A    8/2008
CN     102295413 A    12/2011
(Continued)

OTHER PUBLICATIONS

S. Scholes, "Interfacial Phenomena in Phase-Separated Glasses", Journal of Non-Crystalline Solids, North-Holland Publishing Company, vol. 19, pp. 167-168 (1975).
(Continued)

*Primary Examiner* — Noah S Wiese
(74) *Attorney, Agent, or Firm* — Oblon, McClelland, Maier & Neustadt, L.L.P.

(57) ABSTRACT

The present invention relates to a method for producing phase-separated glass, sequentially including a melting step of melting a glass, a phase separation step of separating phases in the glass, and a shaping step of shaping the glass, and to the phase-separated glass obtained by the production method.

12 Claims, 2 Drawing Sheets

Related U.S. Application Data continuation of application No. PCT/JP2013/077765, filed on Oct. 11, 2013.

(51) Int. Cl.
  *C03C 4/08* (2006.01)
  *C03C 21/00* (2006.01)
  *C03B 5/23* (2006.01)
  *C03C 4/18* (2006.01)

(52) U.S. Cl.
  CPC ............ *C03C 4/18* (2013.01); *C03C 10/0018* (2013.01); *C03C 10/0054* (2013.01); *C03C 21/002* (2013.01); *C03C 2204/04* (2013.01); *Y02P 40/57* (2015.11)

(58) Field of Classification Search
  USPC .............................................. 65/32.3; 501/32
  See application file for complete search history.

(56) References Cited

U.S. PATENT DOCUMENTS

| | | |
|---|---|---|
| 4,309,219 A | 1/1982 | Flannery et al. |
| 6,294,490 B1 | 9/2001 | Zou et al. |
| 6,569,792 B2 | 5/2003 | Zou et al. |
| 6,774,072 B2 | 8/2004 | Zou et al. |
| 6,960,399 B2 | 11/2005 | Zou et al. |
| 7,264,894 B2 | 9/2007 | Zou et al. |
| 2002/0028740 A1 | 3/2002 | Zou et al. |
| 2003/0171201 A1 | 9/2003 | Zou et al. |
| 2004/0241455 A1 | 12/2004 | Zou et al. |
| 2006/0040142 A1 | 2/2006 | Zou et al. |
| 2012/0189844 A1* | 7/2012 | Jain .................. C03B 19/06 428/338 |
| 2015/0111030 A1 | 4/2015 | Miyasaka et al. |
| 2015/0140336 A1 | 5/2015 | Sakagami et al. |

FOREIGN PATENT DOCUMENTS

| | | | |
|---|---|---|---|
| EP | 1 577 275 A2 | 9/2005 | |
| JP | 61-104253 A | 5/1986 | |
| JP | 62-27352 A | 2/1987 | |
| JP | 64-79030 A | 3/1989 | |
| JP | 2003246646 A * | 9/2003 | ............. C03C 17/02 |
| JP | 2009-061730 | 3/2009 | |
| WO | WO 2013-133357 A1 | 9/2013 | |

OTHER PUBLICATIONS

International Search Report dated Jan. 21, 2014 in PCT/JP2013/077765 filed Oct. 11, 2013.

* cited by examiner

MANUFACTURING METHOD FOR PHASE-SEPARATED GLASS, AND PHASE-SEPARATED GLASS

CROSS REFERENCE TO RELATED APPLICATIONS

The present application is a divisional of U.S. patent application Ser. No. 14/685,131, filed on Apr. 13, 2015, the text of which is incorporated herein by reference and which is a continuation application of international patent application PCT/JP2013/077765, filed Oct. 11, 2013, the text of which is incorporated herein by reference and which claims priority to Japanese patent application JP 2012-226854, filed Oct. 12, 2012, the text of which is incorporated herein by reference.

TECHNICAL FIELD

The present invention relates to a method for producing phase-separated glass and to phase-separated glass. In more detail, it relates to a method for producing a phase-separated glass that can be preferably used as an exterior member for electronic devices, for example, portable communication devices or information devices; and to the phase-separated glass.

BACKGROUND ART

For the chassis of electronic devices such as mobile phones, in consideration of a variety of factors such as decorativeness, scratch resistance, workability, and cost, an appropriate material selected from resins, metals, and other materials is used. In recent years, an attempt has been made regarding the use of glass, which was not used in the past, as a material for chassis (Patent Document 1). According to Patent Document 1, in electronic devices such as mobile phones, when the chassis main body is formed of glass, it is possible to exhibit a unique transparent decoration effect.

An electronic device includes a display device such as a liquid crystal panel on the outer surface of the device. For the display device, there is a tendency to high definition and high brightness and, accordingly, for backlights serving as a light source as well, there is a tendency to high brightness. Light from a light source is not only radiated toward the display device side but is also, in some cases, reflected in the inside of the device multiple times so as to arrive at the inner surface of the chassis covering the device.

Even for organic EL (Electro-Luminescence) displays requiring no light source, similarly, there is a concern of the leakage of light coming from a light-emitting element. When metal is used as a chassis material, no problem is caused; however, in the case of using the transparent glass, there is a concern that light from the light source may pass through the chassis and be sensed outside the device. Therefore, when glass is used for the chassis, a method for forming a coated film to impart shielding properties against visible light (hereinafter, simply referred to as shielding properties) to the glass has been used.

In order to form a coated film having sufficient shielding properties on the inner surface (facing the device) of the glass, it is necessary to form a thick coated film or form a film made up of a plurality of layers, which increases the number of steps and the cost.

In addition, in the case in which the coated film is not uniformly formed, there is a concern that the appearance of the device is impaired since light passes through only places having a thin coated film and the chassis is locally sensed to be bright. For example, for a recessed chassis, it is necessary to form a uniform film on the entire surface of the recessed surface. However, a step for uniformly forming a coated film having sufficient shielding properties on the recessed surface is complicated and thus causes an increase of the cost.

PRIOR ART DOCUMENT

Patent Document

[Patent Document 1] JP-A-2009-61730

SUMMARY OF THE INVENTION

Problems that the Invention is to Solve

As a method for providing shielding properties to glass, it is possible to consider making crystals precipitate appropriately in the glass to make the glass opaque. However, in order to appropriately precipitate crystals in glass, an appropriately-controlled crystallization process is required.

As a method for providing shielding properties to glass, the present inventors considered subjecting the glass to phase-separation to make the glass opaque. However, even in this method, in order to appropriately separate phases, an appropriately-controlled phase-separation thermal treatment is required. That is, as a method for separating phases in glass, it is common to use methods in which glass is melted, cooled to room temperature and then subjected to a phase separation thermal treatment (refer to JP-A-S61-104253, JP-A-S62-027352, and JP-A-H01-079030).

However, in these methods, it is necessary to once produce glass and then additionally carry out a phase separation treatment, and thus the production efficiency is low and there is a problem with the cost. In addition, there are cases in which, when a glass raw material is melted, shaped, and then annealed or profiled, thereby producing glass, the glass undergoes phase separation in steps coming after the shaping; however, in these cases, there is a concern that the glass becomes heterogeneous due to the temperature unevenness or the like which is likely to be caused in a temperature-lowering step. Here, the meaning of "heterogeneous" include heterogeneous due to the compositional distribution, and heterogeneous in terms of shielding properties or hue caused by a change in the structure or phase separation particle size distribution due to the temperature distribution.

Therefore, an object of the present invention is to provide a method for producing phase-separated glass which enables the improvement of the production efficiency and the reduction of the production cost and can produce homogeneous phase-separated glass.

Means for Solving the Problems

The present inventors found that, when phase-separated glass is produced by melting glass, separating phases and then shaping the glass, a phase separation thermal treatment after the shaping is not required, a phase separation treatment at a high temperature is possible, and homogeneous phase-separated glass can be obtained, and they completed the present invention.

That is, the present invention relates to the followings.

1. A method for producing phase-separated glass, containing a melting step of melting a glass, a phase separation step of separating phases in the molten glass, and a shaping step of shaping the phase-separated glass.

2. The method for producing phase-separated glass according to item 1, in which the glass is stirred between the melting step and the phase separation step or in the phase separation step.
3. The method for producing phase-separated glass according to item 1 or 2, in which, in the phase separation step, phases are separated by holding the glass at a temperature of a phase separation initiation temperature or lower and higher than 1,200° C.
4. The method for producing phase-separated glass according to item 3, in which a holding time of the glass at the temperature of the phase separation initiation temperature or lower and higher than 1,200° C. is 1 minute or longer and 6 hours or shorter.
5. The method for producing phase-separated glass according to item 3 or 4, in which a viscosity of the glass at any of the temperature of the phase separation initiation temperature or lower and higher than 1,200° C. is $10^2$ dPa·s or more and $10^6$ dPa·s or less.
6. The method for producing phase-separated glass according to any one of items 1 to 5, in which the glass is an alkali silicate glass and contains a total of 6% by mass or more of $Na_2O$ and $K_2O$, and 0.5% by mass or more of $P_2O_5$.
7. The method for producing phase-separated glass according to any one of items 1 to 6, in which the glass contains at least one of CaO and BaO, and a total content of CaO and BaO is less than 6% by mass.
8. The method for producing phase-separated glass according to any one of items 1 to 7, in which the glass contains, in terms of an oxide-based mole percentage, $SiO_2$ in a range of 50% to 80%, $Al_2O_3$ in a range of 0% to 10%, $B_2O_3$ in a range of 0% to 7%, MgO in a range of 2% to 30%, at least one selected from $ZrO_2$, $P_2O_5$, $TiO_2$, and $La_2O_3$ in a range of 0.5% to 10% in total, and $Na_2O$ in a range of 1% to 17%.
9. The method for producing phase-separated glass according to any one of items 1 to 8, in which the glass contains, in terms of an oxide-based mole percentage, $SiO_2$ in a range of 50% to 80%, $Al_2O_3$ in a range of 0% to 10%, $B_2O_3$ in a range of 0% to 4%, MgO in a range of 5% to 30%, at least one selected from $ZrO_2$, $P_2O_5$, $TiO_2$, and $La_2O_3$ in a range of 0.5% to 10% in total, and $Na_2O$ in a range of 1% to 17%.
10. The method for producing phase-separated glass according to any one of items 1 to 9, in which a light transmittance at a thickness of 1 mm and at each wavelength of a wavelength of 800 nm, a wavelength of 600 nm, and a wavelength of 400 nm is 50% or less.
11. The method for producing phase-separated glass according to any one of items 1 to 10, in which a light transmittance at a thickness of 1 mm and at a wavelength of 1,000 nm is 50% or less.
12. The method for producing phase-separated glass according to any one of items 1 to 11, in which a value (Tmax/Tmin) obtained by dividing a maximum value (Tmax) by a minimum value (Tmin) of a light transmittance at a thickness of 1 mm and at a wavelength in a range of 800 nm to 400 nm is 50 or less.
13. A method for producing chemically-strengthened glass, in which an ion exchange treatment is carried out on a phase-separated glass produced by using the method for producing phase-separated glass described in any one of items 1 to 12.
14. The method for producing chemically-strengthened glass according to item 13, in which a light transmittance at a thickness of the chemically-strengthened glass of 1 mm and at each wavelength of a wavelength of 800 nm, a wavelength of 600 nm, and a wavelength of 400 nm is 50% or less.

15. A method for producing an electronic device chassis including chemically-strengthened glass, in which the chemically-strengthened glass is produced by using the method for producing chemically-strengthened glass described in item 13 or 14.
16. A phase-separated glass, having a structure satisfying Equation (1) described below when, for particles having a diameter of 100 nm or more generated by phase separation, an average particle size (diameter) of all the particles is represented by dA, an average value of particle size of 10% from larger particle size (diameter) is represented by dL, and an average value of particle size (diameter) of 10% from smaller particle size (diameter) is represented by dS, $$(dL-dS)/dA \geq 1.0 \qquad (1).$$

17. The phase-separated glass according to item 16, in which the dA is more than 0.2 μm.
18. The phase-separated glass according to item 16 or 17, in which the glass is an alkali silicate glass and contains a total of 6% by mass or more of $Na_2O$ and $K_2O$, and 0.5% by mass or more of $P_2O_5$.
19. The phase-separated glass according to any one of items 16 to 18, in which the glass contains at least one of CaO and BaO and a total content of CaO and BaO is less than 6% by mass.
20. The phase-separated glass according to any one of items 16 to 19, containing, in terms of an oxide-based mole percentage, $SiO_2$ in a range of 50% to 80%, $Al_2O_3$ in a range of 0% to 10%, $B_2O_3$ in a range of 0% to 7%, MgO in a range of 2% to 30%, at least one selected from $ZrO_2$, $P_2O_5$, $TiO_2$, and $La_2O_3$ in a range of 0.5% to 10% in total, and $Na_2O$ in a range of 1% to 17%.
21. The phase-separated glass according to any one of items 16 to 20, containing, in terms of an oxide-based mole percentage, $SiO_2$ in a range of 50% to 80%, $Al_2O_3$ in a range of 0% to 10%, $B_2O_3$ in a range of 0% to 4%, MgO in a range of 5% to 30%, at least one selected from $ZrO_2$, $P_2O_5$, $TiO_2$, and $La_2O_3$ in a range of 0.5% to 10% in total, and $Na_2O$ in a range of 1% to 17%.
22. The phase-separated glass according to any one of items 16 to 21, in which a light transmittance at a thickness of 1 mm and at each wavelength of a wavelength of 800 nm, a wavelength of 600 nm, and a wavelength of 400 nm is 50% or less.
23. The phase-separated glass according to any one of items 16 to 22, in which a light transmittance at a thickness of 1 mm and at a wavelength of 1.000 nm is 50% or less.
24. The phase-separated glass according to any one of items 16 to 23, in which a value (Tmax/Tmin) obtained by dividing a maximum value (Tmax) by a minimum value (Tmin) of a light transmittance at a thickness of 1 mm and at a wavelength in a range of 800 nm to 400 nm is 50 or less.
25. A chemically-strengthened glass obtained by carrying out an ion exchange treatment on the phase-separated glass described in any one of items 16 to 24.
26. An electronic device chassis, in which the phase-separated glass described in any one of items 16 to 24, or the chemically-strengthened glass described in item 25 is used.

Advantage of the Invention

The method for producing phase-separated glass according to the present invention, owing to the phase separation step of separating phases in glass provided between the melting step of melting glass and the shaping step of shaping the glass, can eliminate the need for a thermal treatment after the shaping step to thereby reduce the cost, and can conduct stirring to produce homogeneous phase-separated glass. In addition, since phase separation of glass can be performed at a temperature higher than the shaping temperature, it is possible to shorten the time necessary for the phase separation step to thereby improve the production efficiency.

MODES FOR CARRYING OUT THE INVENTION

Hereinafter, preferred embodiments of the method for producing phase-separated glass of the present invention will be described.

The present invention relates to a method for producing phase-separated glass sequentially including a melting step of melting glass, a phase separation step of separating phases in the molten glass, and a shaping step of shaping the phase-separated glass, and the phase-separated glass obtained by using the production method.

[Melting Step]

The melting step is a step of melting glass. In the melting step, appropriate amounts of a variety of glass raw materials are blended and heated at preferably in a range of 1,400° C. to 1,750° C. and more preferably in a range of 1,500° C. to 1,650° C. so as to be melted. The melting time is, generally, preferably in a range of 1 hour to 50 hours and more preferably in a range of 2 hours to 24 hours. The glass is preferably homogenized by defoaming, stirring, or the like after being melted. Meanwhile, between the melting step and the phase separation step or in the phase separation step, the glass is preferably stirred so as to be homogenized.

The melting temperature may be set in consideration of the phase separation initiation temperature described below. The melting temperature is preferably the phase separation initiation temperature or higher. When the melting temperature is set to be the phase separation initiation temperature or higher, it is possible to diminish the unevenness of the shielding degree (whiteness degree) due to the temperature distribution in a melting kiln.

[Phase Separation Step]

The phase separation step is a step of separating phases in the glass melted in the melting step. In the present invention, the phase separation in glass refers to the division of single-phase glass into two or more glass phases. The method for separating phases in the glass is preferably a method in which the glass is held at a temperature of the phase separation initiation temperature or lower and higher than 1,200° C. so as to separate phases.

Here, the meaning of "the holding the glass at a temperature of the phase separation initiation temperature or lower and higher than 1,200° C." includes the holding of the glass at any constant temperature within a temperature of the phase separation initiation temperature or lower and higher than 1,200° C., and the cooling of the glass at a certain cooling rate in the temperature range of the phase separation initiation temperature or lower and higher than 1,200° C. That is, the "holding time of the glass at a temperature of the phase separation initiation temperature or lower and higher than 1,200° C." refers to the sum of elapsed times which are the differences between points in time when the glass falls into and comes out of the above-described temperature range.

The temperature at which a phase separation treatment is carried out on the glass is preferably the phase separation initiation temperature or lower and higher than 1,200° C., more preferably 1,225° C. or higher, still more preferably 1,250° C. or higher, still more preferably 1,275° C. or higher, and particularly preferably 1,300° C. or higher. In addition, the temperature is preferably 1,500° C. or lower, more preferably 1,400° C. or lower, still more preferably 1,350° C. or lower, and particularly preferably 1,325° C. or lower.

The time during which the phase separation treatment is carried out on the glass is preferably 1 minute or longer, more preferably 5 minutes or longer, and still more preferably 8 minutes or longer from the viewpoint of the production efficiency. In addition, the time is preferably 6 hours or shorter, more preferably 4 hours or shorter, still more preferably 2 hours or shorter, and particularly 90 minutes or shorter.

The viscosity of the glass at any of the temperature of the phase separation initiation temperature or lower and higher than 1,200° C. is preferably $10^6$ dPa·s or less, more preferably $10^5$ dPa·s or less, more preferably $10^4$ dPa·s or less, still more preferably $10^{3.5}$ dPa·s or less, and particularly preferably $10^3$ dPa·s or less. In addition, the viscosity is preferably $10^2$ dPa·s or more, more preferably $10^{2.5}$ dPa·s or more, and still more preferably $10^{2.7}$ dPa·s or more. When the viscosity of the glass is $10^6$ dPa·s or less, the shaping after the phase separation treatment becomes easy. In addition, when the viscosity of the glass is $10^2$ dPa·s or more, it is possible to suppress the unevenness of the whiteness degree.

The phase separation initiation temperature can be measured by using, for example, a hot-thermocouple device manufactured by Texcell Corporation. The hot-thermocouple device utilizes a thermocouple to provide a temperature detectivity, a heater function and a specimen-holding function (JP-A-2007-178412; JP-A-2011-059089; Journal of the Japan Society of Calorimetry and Thermal Analysis, Vol. 13, No. 2, 1986). In the hot-thermocouple device, a filament forming the thermocouple is heated with the half cycle of a heating waveform and a thermoelectric power generated in the filament is measured by using a temperature-measuring circuit with the remaining half cycle.

To near the junction of the thermocouple in the hot-thermocouple device is attached glass powder, followed by heating up to 1,650° C. and to be melted, and while the molten glass is observed by using an optical microscope, the temperature of the molten glass is lowered from 1,650° C. at 1° C./s and the temperature at which the molten glass becomes cloudy is considered as the "phase separation initiation temperature".

Alternately, a blended raw material batch or glass cullet is uniformly dissolved at 1,600° C., held at a constant temperature of 1,600° C. or lower for 30 minutes and then, rapidly cooled, and whether or not the temperature is the phase separation initiation temperature or lower can be determined on the basis of whether or not the phase-separated particles grow. The sizes of the phase-separated particles are observed by using a scanning electron microscope (SEM). In the case in which the holding temperature is the phase separation initiation temperature or lower, the phase-separated particles grow; however, in the case of higher than the phase separation initiation temperature, the particles do not grow. The phase separation initiation temperature can be obtained by checking whether or not the growth of the phase-separated particles occurs while the holding temperature is changed at intervals of 10° C., in a temperature of 1,600° C. or lower. Particularly, in the case in which a volatile component is included, preferred is a method in which whether or not phase-separated particles grow is checked by using a SEM.

Whether or not phases are separated in the glass can be observed on the basis of whether or not the transmittance is decreased as compared with that before the phase separation treatment. Regarding the transmittance of the phase-separated glass, the transmittance of 1 mm-thick glass against light having a wavelength of 600 nm is preferably 80% or less and more preferably 50% or less.

In order to impart shielding properties to the phase-separated glass, the transmittance of the 1 mm-thick glass against light at each wavelength of a wavelength of 800 nm, a wavelength of 600 nm, and a wavelength of 400 nm is preferably 50% or less, more preferably 40% or less, still more preferably 30% or less, particularly preferably 20% or less, and most preferably 10% or less. In addition, the transmittance of the 1 mm-thick glass against light having a wavelength of 800 nm is preferably 20% or less.

In addition, the light transmittance at a thickness of 1 mm and at a wavelength of 1,000 nm is preferably 50% or less, preferably 40% or less, still more preferably 30% or less, particularly preferably 20% or less, and most preferably 10% or less. The transmittance of the phase-separated glass can be measured by using an ordinary transmittance measurement (in-line transmittance measurement).

In order to make the phase-separated glass hardly become hued, the value (Tmax/Tmin) obtained by dividing the maximum value (Tmax) by the minimum value (Tmin) of the light transmittance at a thickness of 1 mm and at a wavelength in a range of 800 nm to 400 nm is preferably 50 or less, more preferably 10 or less, and still more preferably 2 or less.

In addition, whether or not phases are separated in the glass can also be determined by using a SEM (scanning electron microscope). That is, in the case in which phases are separated in the glass, when observed by using a SEM, the glass divided into two or more phases can be observed.

The state of the phase-separated glass includes a binodal state and a spinodal state. The binodal state refers to a separated phase by a nucleation and growth mechanism and, generally, has a spherical shape. The spinodal state refers to a state in which separated phases have regularity to some extent and are alternately and continuously entangled with each other in a three-dimensional manner.

In the case in which chemically-strengthened glass is produced by subjecting the phase-separated glass to an ion exchange treatment, in order to increase the surface compressive stress in a chemically-strengthened layer having the surface compressive stress, the phase-separated glass to be subjected to the ion exchange treatment is preferably in the binodal state. Particularly, it is preferred that dispersed phases of other silica-rich components are present in an alkali-rich matrix. In order to achieve such a state, the content of an alkali metal oxide is preferably increased.

The phase-separated glass is preferably whitened. In order to whiten the phase-separated glass, the average particle size (diameter) of the dispersed phase in the phase-separated glass is preferably 200 nm or more, more preferably 230 nm or more, and still more preferably 250 nm or more. In addition, the average particle size is preferably 2,000 nm or less, more preferably 1,500 nm or less, and still more preferably 1,000 nm or less. The average particle size of the dispersed phase can be measured through SEM observation.

In addition, in order to whiten the phase-separated glass, it is preferred that the difference in refractive index between particles in the dispersed phase and the peripheral matrix in the phase-separated glass is large. Furthermore, the ratio of the volume of the particles in the dispersed phases in the phase-separated glass is preferably 10% or more, more preferably 13% or more, and still more preferably 15% or more. Here, the ratio of the volume of the particles in the dispersed phases can be estimated from the ratio of dispersed particles distributed on the glass surface by calculating the ratio of dispersed particles from a SEM observation photograph.

[Shaping Step]

The shaping step is a step of shaping the glass in which phases are separated in the phase separation step. In the shaping step, the glass is shaped into a plate shape or the like through a well-known float method, down draw method, press method, rollout method, or the like or into a block shape through casting, annealed, then, worked into an arbitrary shape, and worked into a desired shape. In the case in which the chemically-strengthened glass is produced, the ion exchange treatment is preferably carried out after the shaping.

The phase-separated glass of the present invention may be shaped not only into a flat plate shape but also into a recessed shape or a protrusion shape. In this case, it is also possible to reheat the glass shaped into a flat plate, a block, or the like and press the glass in a molten state. In addition, the molten glass may be shaped into a desired shape through a so-called direct press method in which the molten glass is made to directly flow on a pressing mold and is pressed. In addition, places corresponding to a display device or a connector in an electronic device may be worked at the same time as pressing or may be cut or the like after pressing.

[Glass Composition]

The glass to be subjected to the melting step in the production method of the present invention preferably has a composition having a phase separation initiation temperature of higher than 1,200° C. and a viscosity allowing the glass to be stirred at higher than 1,200° C. The viscosity of the glass to be subjected to the melting step is, typically, preferably $10^6$ dPa·s or less, more preferably $10^5$ dPa·s or less, more preferably $10^4$ dPa·s or less, still more preferably $10^{3.5}$ dPa·s or less, and particularly preferably $10^3$ dPa·s or less. In addition, the viscosity is preferably $10^2$ dPa·s or more, more preferably $10^{2.5}$ dPa·s or more, and still more preferably $10^{2.7}$ dPa·s or more. When the glass has a phase separation initiation temperature of higher than 1,200° C. and a viscosity allowing the glass to be stirred at higher than 1,200° C. (typically, $10^6$ dPa·s or less), it is possible to improve the homogeneity.

It is preferable that the glass to be subjected to the melting step in the production method of the present invention is alkali silicate glass and contains a total of 6% by mass or more of $Na_2O$ and $K_2O$ and 0.5% by mass or more of $P_2O_5$. When the glass is alkali silicate glass, it is easy to exchange ions in the phase-separated glass, and the durability and the strength improve. The total content of $Na_2O$ and $K_2O$ is preferably 6% by mass or more and more preferably 8% by mass or more. When the glass contains a total of 6% by mass or more of $Na_2O$ and $K_2O$, it is possible to increase the strength of the glass in the case in which the phase-separated glass is subjected to an ion exchange treatment.

In addition, the content of $P_2O_5$ is preferably 0.5% by mass or more and more preferably 1% by mass or more. When the content of $P_2O_5$ is set to 0.5% by mass or more, it becomes easy to separate phases in the glass.

In the case in which the glass contains CaO or BaO, the total content of CaO and BaO is preferably less than 6% by mass and more preferably 4% by mass or less. When the total content of CaO and BaO is less than 6% by mass ion exchange is hardly hindered.

Examples of the composition of the glass to be subjected to the melting step in the production method of the present invention include Compositions I to V described below.

(Composition I)

The glass to be subjected to the melting step in the production method of the present invention preferably contains, in terms of the oxide-based mole percentage, $SiO_2$ in a range of 50% to 80%, $Al_2O_3$ in a range of 0% to 10%, $B_2O_3$ in a range of 0% to 7%, MgO in a range of 2% to 30%, at least one selected from $ZrO_2$, $P_2O_5$, $TiO_2$, and $La_2O_3$ in a range of 0.5% to 10% in total, and $Na_2O$ in a range of 1% to 17%.

The content of $SiO_2$ is preferably in a range of 50% to 80%, more preferably in a range of 55% to 75%, and still more preferably in a range of 58% to 70%. The content of $Al_2O_3$ is preferably in a range of 0% to 10%, more preferably in a range of 1% to 7%, and still more preferably in a range of 2% to 5%. Meanwhile, for example, the content of $Al_2O_3$ being preferably in a range of 0% to 10% means that the glass may or may not contain $Al_2O_3$ and, in the case of containing $Al_2O_3$, the content is preferably 10% or less.

The content of $B_2O_3$ is preferably in a range of 0% to 7%, preferably in a range of 0% to 4%, more preferably in a range of 0.3% to 3%, and still more preferably in a range of 0.5% to 2%. The content of MgO is preferably in a range of 2% to 30%, more preferably in a range of 5% to 30%, more preferably in a range of 10% to 28%, and still more preferably in a range of 15% to 25%.

The glass preferably contains at least one selected from $ZrO_2$, $P_2O_5$, $TiO_2$, and $La_2O_3$. When the glass contains at least one selected from $ZrO_2$, $P_2O_5$ and $La_2O_3$, it is possible to make the glass more whitish. The total amount thereof is preferably in a range of 0.5% to 10%.

The content of $ZrO_2$ in the glass is preferably in a range of 0% to 5% and more preferably in a range of 0.5% to 3%. The content of $P_2O_5$ in the phase-separated glass is preferably in a range of 0% to 10%, more preferably in a range of 0.5% to 7%, and still more preferably in a range of 1% to 6%. The content of $TiO_2$ in the phase-separated glass is preferably in a range of 0% to 10%, more preferably in a range of 0.5% to 7%, and still more preferably in a range of 1% to 6%. The content of $La_2O_3$ in the glass is preferably in a range of 0% to 2% and more preferably in a range of 0.2% to 1%.

When the glass contains $Na_2O$, it is possible to increase the glass strength through the subsequent ion exchange treatment. The content of $Na_2O$ in the glass is preferably in a range of 1% to 17%, more preferably in a range of 3% to 11%, and still more preferably in a range of 4% to 14%. When the content of $Na_2O$ is set to 1% or more, it becomes easy to form a desired surface compressive stress layer by exchanging ions. In addition, when the content of $Na_2O$ is set to 17% or less, the weather resistance can be improved.

(Composition II)

The glass to be subjected to the melting step in the production method of the present invention preferably contains, in terms of the oxide-based mole percentage, $SiO_2$ in a range of 50% to 80%, $Al_2O_3$ in a range of 0% to 10%, $B_2O_3$ in a range of 0% to 4%, MgO in a range of 5% to 30%, at least one selected from $ZrO_2$, $P_2O_5$, $TiO_2$, and $La_2O_3$ in a range of 0.5% to 10% in total, and $Na_2O$ in a range of 1% to 17%.

The content of MgO is preferably in a range of 5% to 30%, more preferably in a range of 10% to 28%, and still more preferably in a range of 15% to 25%. The composition of the other components is the same as that in composition I.

(Composition III)

The glass to be subjected to the melting step in the production method of the present invention preferably contains, in terms of the oxide-based mole percentage. $SiO_2$ in a range of 50% to 80%, $Al_2O_3$ in a range of 0% to 8%, MgO in a range of 11% to 30%, $Na_2O$ in a range of 0% to 15%, and $P_2O_5$ in a range of 0.5% to 15%.

The content of $SiO_2$ is preferably in a range of 50% to 80%, more preferably 52% or more, still more preferably 55% or more, and particularly preferably 60% or more. In addition, the content is more preferably 75% or less, still more preferably 73% or less, and particularly preferably 66% or less. When the content of $SiO_2$ is set to 50% or more, it is possible to prevent the weather resistance or scratch resistance of the glass from being degraded. On the other hand, when the content of $SiO_2$ is set to 80% or less, it is possible to prevent the melting point of the glass from being increased.

The content of $Al_2O_3$ is preferably in a range of 0% to 8%. In the case of containing $Al_2O_3$, the content thereof is preferably 0.5% or more and more preferably 1% or more. $Al_2O_3$ has an effect that imparts an action that degrades the chemical durability or thermal expansion coefficient of the glass and a function that significantly improves the dispersion stability between $SiO_2$ and other components so as to make the separated phases in the glass uniform. When the content of $Al_2O_3$ is 0.5% or more, the effect is small. In the case in which the chemical strengthened characteristics are improved by exchanging ions, the content is preferably 2% or more and more preferably 3% or more.

The content of $Al_2O_3$ is preferably 8% or less, more preferably 6% or less, still more preferably 5% or less, and particularly preferably 4% or less. When the content of $Al_2O_3$ is set to 8% or less, it is possible to prevent the dissolution temperature of the glass from being increased, to prevent the phase separation from becoming difficult to occur, and to suppress an increase in the transmittance.

The content of MgO is preferably in a range of 11% to 30%. The content of MgO is more preferably 13% or more and still more preferably 15% or more, and more preferably 27% or less and still more preferably 25% or less. MgO is a component having an effect that decreases the thermal expansion coefficient of the glass or facilitates phase separation in conjunction with $SiO_2$ and $Na_2O$ and improves the milkiness.

When the content of MgO is set to 11% or more, the milkiness becomes sufficient. When the content is set to 30% or less, conversely, it is possible to prevent the milkiness from being decreased. In the case in which it is necessary to improve the chemical strengthened characteristics by exchanging ions, the content of MgO is preferably 25% or less, more preferably 23% or less, and typically 18% or less.

The content of $Na_2O$ is preferably in a range of 0% to 15%, more preferably 14% or less, and still more preferably 13% or less. Particularly, in the case in which it is necessary to make the glass whitish, the content is preferably 12% or less, more preferably 11% or less, and still more preferably 10% or less. When the content of $Na_2O$ is set to 15% or less, it is possible to prevent the weather resistance of the glass from being degraded and to suppress the decrease in the milkiness.

The inclusion of $Na_2O$ is preferable in view of lowering the meltability of the glass and, in the case of carrying out chemical strengthening, the glass preferably contains $Na_2O$. In the case of containing $Na_2O$, the content thereof is preferably 1% or more, more preferably 2% or more, and still more preferably 4% or more. When the content is set to 1% or more, the effect of the inclusion can be sufficiently obtained.

In the case in which the strength of the glass is increased through an ion exchange treatment, the content of $Na_2O$ is preferably 1.5% or more and more preferably 6% or more. When the content of $Na_2O$ is set to 1.5% or more, it becomes easy to form a desired surface compressive stress in the case of conducting an ion exchange. The content is particularly preferably 8% or more and typically 9% or more.

$P_2O_5$ is a basic component that accelerates phase separation in conjunction with $SiO_2$, MgO, and $Na_2O$ and significantly accelerates the milky whitening of the glass. The content of $P_2O_5$ is preferably in a range of 0.5% to 15%. The content is more preferably 1% or more, still more preferably 3% or more and particularly preferably 4% or more, and is more preferably 14% or less, still more preferably 10% or less and particularly preferably 7% or less.

When the content of $P_2O_5$ is set to 0.5% or more, the milkiness of the glass becomes sufficient. In addition, when the content is set to 15% or less, volatilization does not easily occur, conversely, the unevenness of milky white is prevented from being intensified, and the appearance of the glass is prevented from being impaired.

In the case in which the content of $SiO_2$ is in a range of 58% to less than 660%, it is preferable that the content of $Al_2O_3$ is in a range of 2% to 6%, the content of $B_2O_3$ is in a range of 0% to 6%, the content of MgO is in a range of 11% to 18%, the content of $Na_2O$ is in a range of 8% to 13%, and the content of $P_2O_5$ is in a range of 3% to 7%.

There are cases in which Composition III preferably includes the following components in addition to the above-described five components. Meanwhile, even in this case, the total of the contents of the above-described five components is preferably 90% or more and typically 94% or more.

$ZrO_2$ is not an essential component; however, in order to significantly improve the chemical durability, $ZrO_2$ may be contained up to 4.5% and the content thereof is preferably 4% or less and more preferably 3% or less. When the content of $ZrO_2$ is set to 4.5% or less, it is possible to prevent the milkiness from being decreased.

CaO, SrO, and BaO are all not essential components; however, in order to increase the milkiness, one or more of these components may be included.

In the case of containing CaO, the content thereof is preferably 3% or less. When the content is set to 3% or less, devitrification becomes difficult to occur or it is possible to prevent the exchange of ions from becoming difficult.

The sum of the contents of CaO, SrO, and BaO is preferably 12% or less, more preferably 8% or less, 6% or less, or 4% or less, and typically 3% or less. When the sum of the contents thereof is set to 12% or less, devitrification becomes difficult to occur or it is possible to prevent the exchange of ions from becoming difficult.

$B_2O_3$ is not an essential component; however, in order to strengthen the meltability of the glass, improve the milkiness of the glass, decrease the thermal expansion coefficient, and, improve the weather resistance, $B_2O_3$ may be contained up to 9% and the content thereof is preferably 6% or less, more preferably 4% or less, and particularly preferably 3% or less. When the content of $B_2O_3$ is set to 9% or less, it is possible to prevent the milkiness from becoming uneven.

$La_2O_3$ is preferred in view of improving the milkiness of the glass. $La_2O_3$ can be contained in a range of 0% to 5%, and the content thereof is preferably 3% or less and more preferably 2% or less. When the content of $La_2O_3$ is set to 5% or less, it is possible to prevent the glass from becoming brittle.

(Composition IV)

The glass to be subjected to the melting step in the production method of the present invention preferably contains, in terms of the oxide-based mole percentage, $SiO_2$ in a range of 50% to 70%, $B_2O_3$ in a range of 0% to 8%, $Al_2O_3$ in a range of 1% to 8%, MgO in a range of 0% to 18%, CaO in a range of 0% to 7%, SrO in a range of 0% to 10%, BaO in a range of 0% to 12%, $ZrO_2$ in a range of 0% to 5%, $Na_2O$ in a range of 5% to 15%, and $P_2O_5$ in a range of 2% to 10%, and it is preferable that the sum of the contents of CaO, SrO and BaO is in a range of 1% to 15%, the sum RO of the contents of MgO, CaO, SrO, and BaO is in a range of 10% to 25%, and the ratio (CaO/RO) of the content of CaO to RO is 0.7 or less.

The content of $SiO_2$ is preferably in a range of 50% to 70%, more preferably 53% or more, still more preferably 55% or more, and particularly preferably 57% or more. The content is more preferably 68% or less and still more preferably 65% or less. When the content is set to 50% or more, it is possible to prevent the weather resistance or scratch resistance of the glass from being degraded. On the other hand, when the content is set to 70% or more, it is possible to prevent the melting point of the glass from being increased.

$B_2O_3$ is not an essential component; however, in order to strengthen the meltability of the glass, improve the milkiness of the glass, decrease the thermal expansion coefficient, and improve the weather resistance, $B_2O_3$ may be contained up to 8%. When the content thereof exceeds 8%, there is a concern that the milkiness may become uneven. The content is preferably 7% or less and more preferably 6% or less.

The content of $Al_2O_3$ is preferably in a range of 1% to 8%, more preferably 2% or more, and still more preferably 3% or more, and is more preferably 7% or less or 6% or less, still more preferably 5% or less, and particularly preferably 4% or less. In the case in which it is necessary to improve the chemical strengthened characteristics by exchanging ions, the content is preferably 3% or more and more preferably 4% or more.

$Al_2O_3$ has an effect that imparts an action that improves the chemical durability of the glass and a function that significantly improves the dispersion stability between $SiO_2$ and other components so as to make the separated phases in the glass uniform. When the content of $Al_2O_3$ is set to 1% or more, the effect can be sufficiently obtained. In addition, when the content of $Al_2O_3$ is set to 8% or less, it is possible to prevent the dissolution temperature of the glass from being increased, to prevent the phase separation from becoming difficult to occur, and to suppress an increase in the transmittance.

MgO is not an essential component; however, in order to facilitate the phase separation in conjunction with $SiO_2$ and $Na_2O$, improve the milkiness or the like, MgO may be contained up to 18%, and the content thereof is preferably less than 11% or 10% or less and more preferably 9% or less. When the content of MgO is set to 18% or less, it is possible to suppress a decrease in the milkiness. In the case in which it is necessary to enhance the milkiness, the content thereof is preferably 8% or less.

In the case of containing MgO, the content thereof is preferably more than 0.5%, more preferably 3% or more, still more preferably 5% or more, and particularly preferably 7% or more. When the content is set to more than 0.5%, the effect can be sufficiently obtained.

CaO, SrO, and BaO are components having an effect that increases the milkiness and the glass preferably contains at least one of them.

In the case of containing CaO, the content thereof is preferably 1% or more and more preferably 2% or more, and is 7% or less, more preferably 6% or less, and still more preferably 5% or less. When the content is set to 7% or less, it is possible to prevent devitrification.

In the case of containing SrO, the content thereof is preferably 1% or more and more preferably 2% or more, and is preferably 10% or less and more preferably 8% or less. When the content is set to 10% or less, it is possible to prevent devitrification.

In the case of containing BaO, the content thereof is preferably 1% or more, more preferably 3% or more, and still more preferably 5% or more, and is preferably 12% or less, more preferably 10% or less, and still more preferably 9% or less. When the content is set to 12% or less, devitrification becomes difficult. BaO has a stronger effect that enhances the whiteness degree than other alkali earth metal oxides.

The sum (CaO+SrO+BaO) of the content of the above-described components is preferably in a range of 1% to 15%, more preferably 2% or more, still more preferably 3% or more, and particularly preferably 5% or more, and is more preferably 13% or less, more preferably 12% or less, and particularly preferably 10% or less. When the CaO+SrO+BaO is set to 1% or more, the effect of the inclusion can be sufficiently obtained. When the sum is set to 15% or less, devitrification becomes difficult.

The sum (RO) of the contents of MgO, CaO, SrO, and BaO is preferably set to 10% or more and more preferably 12% or more, and is preferably 22% or less and more preferably 20% or less. When RO is set to 10% or more, it is possible to prevent the dissolution temperature from being increased. When the sum is set to 25% or less, devitrification becomes difficult.

The ratio (CaO/RO) of the content of CaO to RO is preferably 0.7 or less, more preferably 0.6 or less, and still more preferably 0.5 or less. When CaO/RO is set to exceeding 0.7 or less, devitrification becomes difficult.

$ZrO_2$ is not an essential component; however, in order to improve the chemical durability, $ZrO_2$ may be contained up to 5% and the content thereof is preferably 4% or less and more preferably 3% or less. When the content is set to 5% or less, it is possible to prevent the milkiness from being decreased. In the case of containing $ZrO_2$, the content thereof is preferably 0.5% or more. When the content thereof is set to 0.5% or less, the effect of the inclusion can be sufficiently obtained.

The content of $Na_2O$ is preferably in a range of 5% to 15%, more preferably 8% or more, and still more preferably 9% or more, and is more preferably 14% or less and still more preferably 13% or less. Particularly, in the case in which it is necessary to make the glass whitish, the content is 12% or less and preferably 11% or less.

$Na_2O$ has an effect that improves the meltability of the glass and, when the content of $Na_2O$ is set to 5% or more, the effect of the inclusion can be sufficiently obtained. In addition, conversely, when the content thereof is set to 15% or less, it is possible to prevent the weather resistance of the glass from being degraded and to suppress the decrease in the milkiness.

In the case in which it is necessary to increase the strength of the glass through an ion exchange treatment, the content of $Na_2O$ is preferably 6% or more, more preferably 7% or more, still more preferably 8% or more, and particularly more preferably 9% or more. When the content thereof is set to 6% or more, it is possible to prevent the formation of a desired surface compressive stress by exchanging ions from becoming difficult.

$P_2O_5$ is a basic component that significantly accelerates the glass to become milky white. The content of $P_2O_5$ is preferably 2% or more, more preferably 3% or more, and still more preferably 4% or more, and is preferably 10% or less, more preferably 8% or less, and still more preferably 7% or less.

When the content of $P_2O_5$ is set to 2% or more, the milkiness of the glass becomes sufficient. On the other hand, when the content is set to 10% or less, volatilization does not easily occur, conversely, it is possible to prevent the unevenness of milky white from being intensified and to suppress the appearance of the glass being impaired.

In the case of containing CaO, the ratio ($CaO/P_2O_5$) of the content thereof to the content of $P_2O_5$ is preferably 1.5 or less and more preferably 1.2 or less. When the ratio is more than 1.5, devitrification is likely to occur.

The glass of the present invention is basically made up of the above-described components, but other components may also be used as long as the object of the present invention is not impaired and, in this case, the sum of such components is preferably 9% or less. Meanwhile, the sum of the contents of eight components of $SiO_2$, $Al_2O_3$, MgO. $Na_2O$, $P_2O_5$, CaO, SrO, and BaO is preferably 90% or more and typically 94% or more.

As the above-described other components, for example, $La_2O_3$ may be contained in a range of 5% or less since it has an effect of improving the milkiness of the glass, and the content thereof is preferably 3% or less and more preferably 2% or less. When containing more than 5%, there is a concern that the glass may become brittle.

(Composition V)

The glass to be subjected to the melting step in the production method of the present invention preferably contains, in terms of the oxide-based mole percentage, $SiO_2$ in a range of 50% to 73%, $B_2O_3$ in a range of 0% to 10%, $Na_2O$ in a range of 3% to 17%, at least one of $Nb_2O_5$ and $Gd_2O_3$ in a range of 0.5% to 10%, and $P_2O_5$ in a range of 0.5% to 10%, and it is preferable that the sum (RO) of the contents of MgO, CaO, SrO, and BaO is in a range of 2% to 25%.

$SiO_2$ is a basic component that forms a network structure of the glass in the white glass of the present invention. That is, $SiO_2$ has an amorphous structure and exhibits excellent mechanical strength, weather resistance, or luster as a glass.

The content of $SiO_2$ is preferably 50% or more, more preferably 53% or more, still more preferably 55% or more, and particularly preferably 57% or more, and is preferably 73% or less, more preferably 70% or less, still more preferably 68% or less, and particularly preferably 65% or less.

When the content of $SiO_2$ is set to 50% or more, the weather resistance or scratch resistance of the glass improves. On the other hand, when the content of $SiO_2$ is set to 73% or less, the melting point of the glass does not become excessively high.

$B_2O_3$ is not an essential component; however, in order to improve the meltability of the glass, improve the shielding property of the glass, decrease the thermal expansion coefficient, and also improve the weather resistance, it is preferably contained 0.5% or more.

The content of $B_2O_3$ is preferably 10% or less, more preferably 8% or less, and still more preferably 6% or less. In addition, in the case of containing $B_2O_3$, the content thereof is preferably 0.5% or more, more preferably 1% or more, still more preferably 2% or more, and particularly preferably 3% or more.

When the content of $B_2O_3$ is set to 10% or less, it is possible to prevent the whiteness degree of the glass from becoming uneven. In the case in which it is necessary to suppress volatilization, the content thereof is preferably 4% or less.

The content of $Na_2O$ is preferably 3% or more, more preferably 5% or more, still more preferably 8% or more, and particularly preferably 9% or more, and is preferably 17% or less, more preferably 14% or less, still more preferably 12% or less, and particularly preferably 10% or less.

$Na_2O$ has an effect that improves the meltability of the glass and, when the content of $Na_2O$ is set to 3% or more, the effect of the inclusion can be sufficiently obtained. In addition, when the content of $Na_2O$ is set to 17% or less, it is possible to prevent the weather resistance of the glass from being degraded and to prevent the shielding property from being degraded.

Particularly, in the case in which it is necessary to impart shielding properties to the glass, the content of $Na_2O$ is preferably set to 12% or less and more preferably 11% or less. In addition, in the case in which it is necessary to increase the strength of the glass through an ion exchange treatment, the content of $Na_2O$ is preferably set to 6% or more.

The content of at least one of $Nb_2O_5$ and $Gd_2O_3$ is preferably 0.5% or more, more preferably 1% or more, still more preferably 2% or more, and particularly preferably 3% or more, and is preferably 10% or less, more preferably 8% or less, still more preferably 6% or less, and particularly preferably 5% or less.

When the content of at least one of $Nb_2O_5$ and $Gd_2O_3$ is set to 0.5% or more, an effect that increases the difference in the refractive index of the glass in which phases are separated into two layers can be sufficiently obtained and it is possible to improve the shielding properties. On the other hand, when the content of at least one of $Nb_2O_5$ and $Gd_2O_3$ is set to 10% or less, it is possible to prevent the glass from becoming brittle.

The content of $Nb_2O_5$ is preferably 0.5% or more, more preferably 1% or more, still more preferably 2% or more, and particularly preferably 3% or more, and is preferably 10% or less, more preferably 8% or less, still more preferably 6% or less, and particularly preferably 5% or less.

When the content of $Nb_2O_5$ is set to 0.5% or more, the effect that increases the difference in the refractive index of the glass in which phases are separated into two layers can be sufficiently obtained and it is possible to improve the shielding properties. On the other hand, when the content of $Nb_2O_5$ is set to 10% or less, it is possible to prevent the glass from becoming brittle.

The content of $Gd_2O_3$ is preferably 0.5% or more, more preferably 1% or more, still more preferably 2% or more, and particularly preferably 3% or more, and is preferably 10% or less, more preferably 8% or less, still more preferably 6% or less, and particularly preferably 5% or less.

When the content of $Gd_2O_3$ is set to 0.5% or more, the effect that increases the difference in the refractive index of the glass in which phases are separated into two layers can be sufficiently obtained and it is possible to improve the shielding properties. On the other hand, when the content of $Gd_2O_3$ is set to 10% or less, it is possible to prevent the glass from becoming brittle.

$P_2O_5$ is a basic component that significantly accelerates the glass to become white. The content of $P_2O_5$ is preferably 0.5% or more, more preferably 2% or more, and still more preferably 4% or more, and is preferably 10% or less, more preferably 8% or less, still more preferably 7% or less, and particularly preferably 6% or less.

When the content of $P_2O_5$ is set to 0.5% or more, the shielding properties of the glass becomes sufficient. On the other hand, when the content of $P_2O_5$ is set to 10% or less, volatilization does not easily occur, it is possible to suppress the unevenness of white from being intensified and to prevent the appearance of the glass being impaired.

MgO, CaO, SrO, and BaO are components having an effect that strengthens the shielding properties and the glass is required to contain at least one of them.

MgO is not essential; however, in order to accelerate phase separation in conjunction with $SiO_2$ and $Na_2O$ and improve the shielding properties, MgO is preferably contained up to 18%. The content of MgO is preferably 18% or less, more preferably 11% or less, still more preferably 10% or less, and particularly preferably 9% or less. When the content of MgO is set to 18% or less, it is possible to prevent the occasional degradation of the shielding properties.

In addition, in the case of containing MgO, the content thereof is preferably more than 0.5%, preferably 3% or more, more preferably 5% or more, and still more preferably 7% or more. When the content is set to more than 0.5%, it is possible to sufficiently obtain the effect that accelerates phase separation and improves the shielding properties.

In the case of containing CaO, the content thereof is preferably 1% or more and more preferably 2% or more, and is preferably 7% or less, more preferably 6% or less, and still more preferably 5% or less. When the content of CaO is set to 7% or less, it is possible to prevent devitrification.

In the case of containing SrO, the content thereof is preferably 1% or more and more preferably 2% or more, and is preferably 10% or less and more preferably 8% or less. When the content of SrO is set to 10% or less, it is possible to prevent devitrification.

BaO has a stronger effect that accelerates the shielding properties than other alkali earth metal oxides. In the case of containing BaO, the content thereof is preferably 1% or more, more preferably 3% or more and still more preferably 5% or more, and is preferably 12% or less, more preferably 10% or less and still more preferably 9% or less. When the content of BaO is set to 12% or less, it is possible to prevent devitrification. In the case in which it is necessary to make the glass resistant to scratch, the content is preferably 8% or less, more preferably 5% or less and still more preferably 2% or less.

The sum (RO) of the contents of MgO, CaO, SrO, and BaO is preferably set to 2% or more, more preferably 4% or more, still more preferably 6% or more, and particularly preferably 8% or more, and is preferably 25% or less, more preferably 20% or less, still more preferably 16% or less, and particularly preferably 12% or less.

When the sum (RO) of the contents of MgO, CaO, SrO, and BaO is set to 2% or more, it is possible to prevent the dissolution temperature from being increased. Meanwhile, when the sum (RO) of the contents of MgO, CaO, SrO, and BaO is set to 25% or less, devitrification becomes difficult.

$Al_2O_3$ has an effect that imparts an action that improves the chemical durability of the glass and a function that significantly improves the dispersion stability between $SiO_2$ and other components so as to make the separated phases in the glass uniform.

The content of $Al_2O_3$ is preferably 1% or more, more preferably 2% or more and still more preferably 3% or more, and is preferably 8% or less, more preferably 7% or less, still more preferably 6% or less, particularly preferably 5% or less, and most preferably 4% or less.

When the content of $Al_2O_3$ is set to 1% or more, the effect can be sufficiently obtained. In the case in which it is necessary to improve the chemical strengthened characteristics by exchanging ions, the content is preferably 3% or more and more preferably 4% or more. On the other hand, when the content of $Al_2O_3$ is set to 8% or less, it is possible to prevent the dissolution temperature of the glass from being increased and to prevent the shielding properties from being degraded.

$ZrO_2$ is not an essential component; however, in order to improve the chemical durability or the like, $ZrO_2$ may be contained up to 5%. The content thereof is preferably 4% or less and more preferably 3% or less. When the content of $ZrO_2$ is set to 5% or less, it is possible to prevent the shielding properties from being degraded. In the case of containing $ZrO_2$, the content thereof is preferably 0.5% or more. When the content is set to 0.5% or more, the effect of the inclusion can be sufficiently obtained.

$TiO_2$ is not an essential component; however, in order to increase the Young's modulus, it may be contained in a range of 5% or less and preferably 3% or less. In the case of containing $TiO_2$, it is preferred to be contained in 0.5% more. When the content of $TiO_2$ is set to 5% or less, it is possible to prevent the devitrification temperature from being increased.

$K_2O$ is not an essential component; however, in order to increase the thickness (DOL) of the compressive stress layer through an ion exchange treatment, it may be contained in a range of 5% or less and preferably 3% or less. In the case of containing $K_2O$, it is preferred to be contained in 0.5% more. When the content of $K_2O$ is set to 5% or less, it is possible to prevent the surface compressive stress (CS) from being decreased in the ion exchange treatment.

$Li_2O$ is not an essential component; however, in order to increase the Young's modulus, it may be contained in a range of 5% or less and preferably 3% or less. In the case of containing $Li_2O$, it is preferred to be contained in 0.5% more. When the content of $Li_2O$ is set to 5% or less, it is possible to prevent the devitrification temperature from being increased.

The glass of the present invention is basically made up of the above-described components, but other components may also be used as long as the object of the present invention is not impaired and, in this case, the sum of such components is preferably 10% or less. Meanwhile, the sum of the contents of 12 components of $SiO_2$, $Al_2O_3$, $B_2O_3$, $MgO$, $Na_2O$, $ZrO_2$, $P_2O_5$, $CaO$, $SrO$, $Nb_2O_5$, $Gd_2O_3$, and $BaO$ is preferably 90% or more and typically 94% or more.

As the above-described other components, for example, $La_2O_3$ is not essential but may be contained, in order to improve the shielding properties of the glass. It is preferred to be contained 0.5% or more. In addition, in order to prevent the glass from becoming brittle, it is preferably set to 5% or less, more preferably set to 3% or less, and still more preferably set to 2% or less.

The glass to be subjected to the melting step in the production method of the present invention include glass having Compositions (1) to (11) described below in terms of the oxide-based mole percentage, in addition to the glass having Compositions I to V.

(1) Glass containing $SiO_2$ in a range of 70% to 90%, CaO in a range of 12% to 25%, and $Li_2O$ in a range of 0% to 10%. Specifically, for example, glass containing 77% of $SiO_2$, 18% of CaO, and 5% of $Li_2O$.

(2) Glass containing $SiO_2$ in a range of 70% to 90%, MgO in a range of 10% to 25%, and $Li_2O$ in a range of 0% to 5%. Specifically, for example, glass containing 79% of $SiO_2$, 18% of MgO, and 3% of $Li_2O$.

(3) Glass containing $SiO_2$ in a range of 75% to 95%, BaO in a range of 0% to 15%, and CaO in a range of 0% to 10%. Specifically, for example, glass containing 87% of $SiO_2$, 8% of BaO, and 5% of CaO.

(4) Glass containing $SiO_2$ in a range of 70% to 95%, CaO in a range of 0% to 25%, and MgO in a range of 0% to 25%. Specifically, for example, glass containing 74% of $SiO_2$, 13% of CaO, and 13% of MgO.

(5) Glass containing $SiO_2$ in a range of 70% to 90%, $Na_2O$ in a range of 0% to 5%, and CaO in a range of 5% to 25%. Specifically, for example, glass containing 82% of $SiO_2$, 3% of $Na_2O$, and 15% of CaO.

(6) Glass containing $SiO_2$ in a range of 70% to 90%, BaO in a range of 0% to 15%, and MgO in a range of 0% to 20%. Specifically, for example, glass containing 82% of $SiO_2$, 8% of BaO, and 10% of MgO.

(7) Glass containing $SiO_2$ in a range of 80% o to 90%, $LiO_2$ in a range of 0% to 5%, and BaO in a range of 5% to 15%. Specifically, for example, glass containing 87% of $SiO_2$, 3% of $LiO_2$, and 10% of BaO.

(8) Glass containing $SiO_2$ in a range of 70% to 90%, $Na_2O$ in a range of 0% to 3%, and MgO in a range of 15% to 25%. Specifically, for example, glass containing 78% of $SiO_2$, 2% of $Na_2O$, and 20% of MgO.

(9) Glass containing $SiO_2$ in a range of 50% to 90%, MgO in a range of 0% to 20%, and $TiO_2$ in a range of 0% to 50%. Specifically, for example, glass containing 65% of $SiO_2$, 10% of MgO, and 25% of $TiO_2$.

(10) Glass containing $SiO_2$ in a range of 65% to 90%, MgO in a range of 10% to 30%, and $Al_2O_3$ in a range of 0% to 5%. Specifically, for example, glass containing 77% of $SiO_2$, 20% of MgO, and 3% of $Al_2O_3$.

(11) Glass containing $SiO_2$ in a range of 75% to 85%, MgO in a range of 0% to 3%, and $Al_2O_3$ in a range of 15% to 25%. Specifically, for example, glass containing 78% of $SiO_2$, 2% of MgO, and 20% of $Al_2O_3$.

The glass may contain $K_2O$. $K_2O$ is a component that improves the meltability and is also a component intended to obtain a desired surface compressive stress and a desired stress layer depth by increasing the ion exchange rate in chemical strengthening. In the case of containing $K_2O$, the content thereof is preferably 1% or more and, in order to improve the ion exchange rate, the content is preferably 2% or more and still more preferably 3% or more. In addition, the content is preferably 9% or less, preferably 7% or less, and still more preferably 6% or less. When the content of $K_2O$ is set to 1% or more, the effect that improves the meltability can be sufficiently obtained. In addition, when the content thereof is set to 9% or less, the weather resistance improves.

To the glass, Co, Mn, Fe, Ni, Cu, Cr, V, Bi, Er, Tm, Nd, Sm, Sn, Ce, Pr, Eu, Ag, or Au may be added as a coloring component. In the case of adding the above-described component, the content thereof is 5% or less in terms of cation %.

[Phase-Separated Glass]

Figure 2A:
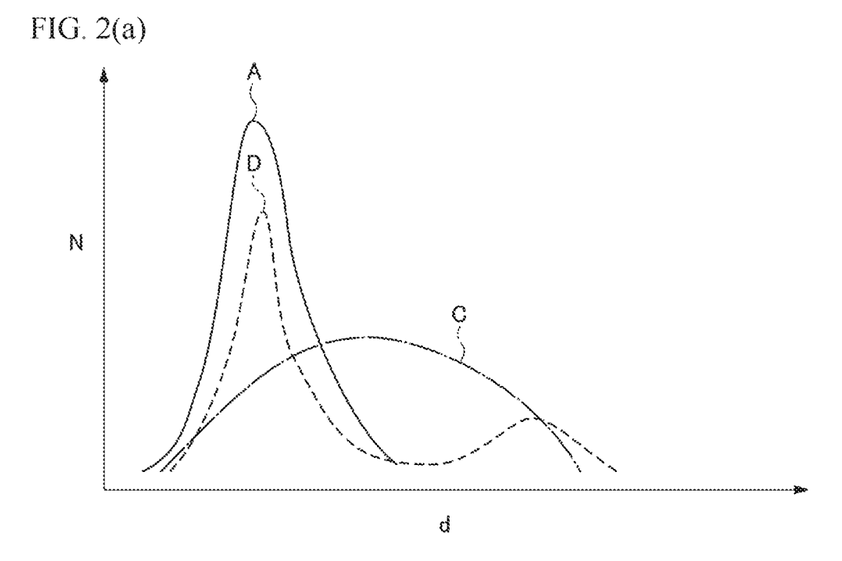
FIG. 2(a) and FIG. 2(b) are conceptual views for describing Equation (1).
Figure 2B:
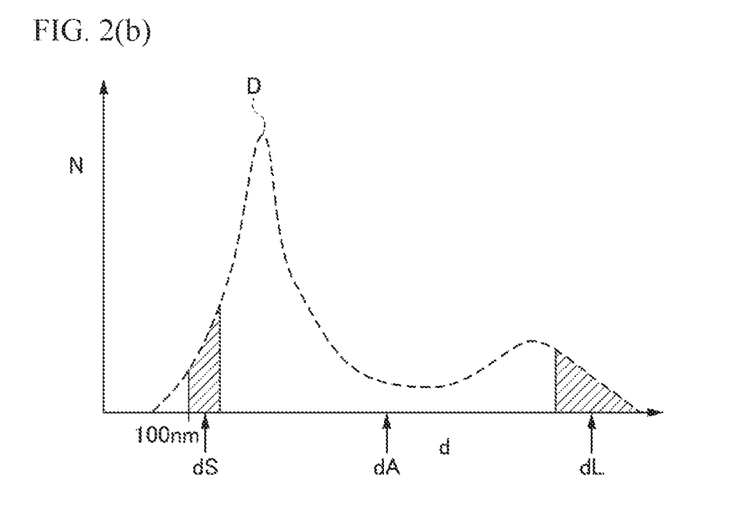

The phase-separated glass of the present invention obtained through the above-described production method has a structure satisfying Equation (1) described below when, for particles having a diameter of 100 nm or more generated by phase separation, as illustrated in FIG. 2(b), the average particle size (diameter) of the whole is represented by dA, the average value of particle size of 10% from larger particle size (diameter) is represented by dL, and the average value of particles size (diameter) of 10% from smalle particle size (diameter) is represented by dS.

$$(dL-dS)/dA \geq 1.0 \quad (1)$$

(dL−dS)/dA is 1.0 or more, preferably 1.1 or more and still more preferably 1.2 or more. In addition, generally, (dL−dS)/dA is preferably 7 or less, more preferably 6 or less and still more preferably 5 or less.

FIGS. 2(a) and 2(b) are conceptual views for describing Equation (1). In FIGS. 2(a) and 2(b), the horizontal axis indicates the diameter d of particles generated by phase separation and the vertical axis indicates the number N of the particles. A in FIG. 2(a) indicates the particle size distribution of particles generated by phase separation in phase-separated glass of the related art. C and D in FIG. 2(a) indicate the particle size distribution of particles generated by phase separation in phase-separated glass of the present invention.

As illustrated by A. C, and D in FIG. 2(a), the phase-separated glass of the present invention satisfying Equation (1) is a phase-separated glass in which the particles generated through phase separation have a wide size distribution of particle size from particles having a large particle size to small particles, as compared with phase-separated glass of the related art. The phase separation treatment in the production method of the present invention can make the obtained phase-separated glass have a structure satisfying Equation (1) by further increasing the number of particles having a large particle size and can contribute to the improvement in the shielding properties.

The particle size (diameter) is measured by means of the following method. The phase-separated glass is optically polished, then, immersed in an aqueous solution of 0.1 M hydrochloric acid, and held at 60° C. for 1 hour, particle phases are etched, and then an observation by a scanning electron microscope (SEM) is conducted to measure the particle size (diameter). Since the particle phases are preferentially etched and form recessed shapes, it is possible to measure the particle size.

In the case in which the electron density difference between the particle phase and the matrix phase is large, the contrast between the particle phase and the matrix phase is strong in the SEM observation. Therefore, it is possible to measure the particle size (diameter) by SEM without conducting etching after the optical polishing.

Meanwhile, in the case in which the particle size (diameter) is less than 100 nm, such particles make only little contribution to the transmittance against wavelengths of 400 nm or more. Thus, particle size of 100 nm or more are measured, the average value thereof is represented by dA, the average value of the extracted 10% largest thereof is represented by dL, and the average value of the 10% smallest thereof is represented by dS.

The dA is preferably more than 0.2 μm, more preferably 0.23 μm or more, and still more preferably 0.25 μm or more from the viewpoint of the shielding properties. In addition, the dA is preferably 2 μm or less, more preferably 1.5 μm or less, and still more preferably 1 μm or less.

[Ion Exchange Treatment]

In electronic devices available in mobile phones and the like, there is a demand for the chassis to have a high strength in consideration of breakage by dropping impact during use or contact damage by long-term use. Therefore, heretofore, in order to improve the scratch resistance of the glass substrate, glass has been chemically strengthened so as to form a compressive stress layer on the surface to improve the scratch resistance of the glass substrate. When the phase-separated glass obtained through the production method of the present invention is subjected to an ion exchange treatment to form a chemically-strengthened glass (hereinafter, the chemically-strengthened glass will also be referred to as the chemically-strengthened glass of the present invention), it is possible to provide a compressive stress layer to the surface and to impart a high strength.

The chemical strengthening refers to a method in which a compressive stress layer is formed on the glass surface to enhance the strength of the glass. Specifically, it is a treatment in which alkali metal ions having a small ionic radius (typically, Li ions or Na ions) on the glass surface are replaced with alkali ions having a large ionic radius (typically, Na ions or K ions against Li ions and K ions against Na ions) by ion exchanging at a temperature of the glass transition temperature or lower.

The chemical strengthening method is not particularly limited as long as $Li_2O$ or $Na_2O$ in the glass surface layer can be ion-exchanged with $Na_2O$ or $K_2O$ in a molten salt and examples thereof include a method in which the glass is immersed in a heated molten salt of potassium nitrate ($KNO_3$).

Though the conditions for forming a chemically-strengthening layer (surface compressive stress layer) having a desired surface compressive stress in the glass vary depending on the thickness of the glass, the temperature condition is preferably in a range of 350° C. to 550° C. and more preferably in a range of 400° C. to 500° C. In addition, the chemical strengthening time is preferably in a range of 1 hour to 144 hours and more preferably 2 hours to 24 hours. Examples of the molten salt include $KNO_3$ and $NaNO_3$. Specifically, for example, the glass is typically immersed in a $KNO_3$ molten salt at a temperature in a range of 400° C. to 550° C. for 2 hours to 24 hours.

In the production of the chemically-strengthened glass used for the chassis, in the case in which the glass has a flat plate shape, a polishing step is carried out in some cases. In the polishing step of the glass, the particle size of polishing grains used for polishing in the final phase is typically in a range of 2 μm to 6 μm and it is considered that, with these polishing grains, finally, a maximum of 5 μm of microcracks are formed on the glass surface.

In order to make the strength-improving effect of the chemical strengthening effective, it is preferred to have the surface compressive stress layer deeper than the microcracks formed in the glass surface and the depth of the surface compressive stress layer generated by the chemical strengthening is preferably 6 μm or more. In addition, the generation of scratches deeper than the surface compressive stress layer during use causes the fracture of the glass and thus the surface compressive stress layer is preferably deep, more preferably 10 μm or more, still more preferably 20 μm or more, and typically 30 μm or more.

Meanwhile, when the surface compressive stress layer is too deep, the internal tensile stress becomes large and the impact of fracture becomes great. That is, it is known that, when the internal tensile stress is large, there is a tendency that the glass is fractured into fine pieces and is scattered. As a result of experiments by the present inventors, it has been clarified that, in the glass having a thickness of 2 mm or less, when the depth of the surface compressive stress layer exceeds 70 μm, the glass significantly scatters when fractured.

Therefore, in the chemically-strengthened glass of the present invention, the depth of the surface compressive stress layer is preferably 70 µm or less. In the case in which the chemically-strengthened glass of the present invention is used as a chassis, while depending on electronic devices to cover, in use in panels or the like, for example, having a high possibility of the surface being worn, it is also possible to make consideration for making the depth of the surface compressive stress layer thin in view of safety, more preferably 60 µm or less, still more preferably 50 µm or less and typically 40 µm or less.

Meanwhile, the depth of the surface compressive stress layer of the chemically-strengthened glass of the present invention can be measured by an EPMA (electron probe micro analyzer), a surface stress meter (e.g., FSM-6000 manufactured by Orihara Industrial Co., Ltd.), or the like.

In the case where a sodium component in the glass surface layer is ion-exchanged with a potassium component in the molten salt in the ion exchange treatment, for example, the concentration of potassium ions in the thickness direction of the phase-separated glass is analyzed by an EPMA and the diffusion depth of the potassium ions obtained through the measurement is taken as the depth of the surface compressive stress layer.

In addition, in the case in which a lithium component in the glass surface layer is ion-exchanged with a sodium component in the molten salt in the ion exchange treatment, the concentration of sodium ions in the thickness direction of the phase-separated glass is analyzed by an EPMA and the diffusion depth of the sodium ions obtained through the measurement is taken as the depth of the surface compressive stress layer.

In addition, by coating a glass having a smaller coefficient of thermal expansion on the surface of the chemically-strengthened glass of the present invention, the surface compressive stress can be imparted due to the thermal expansion difference. When clear glass is used, it is also possible to obtain an effect of improving the appearance due to reflection on the front surface and back surface of the coated glass.

In the chemically-strengthened glass of the present invention, the transmittance of the 1 mm-thick glass against light at each wavelength of a wavelength of 1,000 nm, a wavelength of 800 nm, a wavelength of 600 nm, and a wavelength of 400 nm is preferably 50% or less, more preferably 40% or less, still more preferably 30% or less, particularly preferably 20% or less, and most preferably 10% or less. Further, the transmittance of the 1 mm-thick glass against light having a wavelength of 800 nm is preferably 20% or less.

In addition, in the chemically-strengthened glass of the present invention, the light transmittance at a thickness of 1 mm and at a wavelength of 1,000 nm is preferably 50% or less, more preferably 40% or less, still more preferably 30% or less, particularly preferably 20% or less, and most preferably 10% or less. The transmittance of the chemically-strengthened glass can be measured by an ordinary transmittance measurement (in-line transmittance measurement).

In the chemically-strengthened glass of the present invention, the value ($T_{max}/T_{min}$) obtained by dividing the maximum value ($T_{max}$) by the minimum value ($T_{min}$) of the light transmittance at a thickness of 1 mm and at a wavelength in a range of 800 nm to 400 nm is preferably 50 or less, more preferably 10 or less, and still more preferably 2 or less. When ($T_{max}/T_{min}$) is set to 50 or less, the glass is not easily hued.

[Use]

Examples of the use of the phase-separated glass of the present invention or the chemically-strengthened glass obtained through the ion exchange treatment of the phase-separated glass include portable electronic devices, desk top personal computers, large-size televisions, construction materials, dishes, porous glass, furniture, home electric appliances, and the like.

The portable electronic devices conceptually include portable communication devices or information devices. Examples of the communication device include communication terminals such as mobile phones, PHS (personal handy-phone systems), smartphones, PDA (personal data assistances), and PND (portable navigation devices, portable car navigation system), broadcasting receivers such as portable radios, portable televisions, one-seg receivers, and the like.

In addition, examples of the information devices include digital cameras, video cameras, portable music players, sound recorders, portable DVD players, portable game players, notebook computers, tablet PCs, electronic dictionaries, electronic diaries, electronic book readers, portable printers, portable scanners, and the like. Meanwhile, examples thereof are not limited to the above-described examples.

When the chemically-strengthened glass of the present invention is used in these portable electronic devices, it is possible to obtain portable electronic devices having a high strength and aesthetic appearance.

The chemically-strengthened glass of the present invention is used, for example, to cover electronic devices. The outer surfaces of a mobile phone is configured such that on one outer surface are disposed a display device made up of a liquid crystal panel or an organic EL display and an operation device made up of buttons or an integrated device of a display device such as a touch panel and an operation device, and a backband surrounds the periphery thereof. The other outer surface is configured to include a panel. In addition, a frame material is present in a thickness portion of the device that is present between the one outer surface and the other outer surface.

There are cases in which the backband and the frame material or the panel and the frame material are configured to be integrated with each other.

The chemically-strengthened glass of the present invention can be used in any of the backband, panel and frame material. In addition, the shape thereof may be a flat plate shape, a curved surface, and a recessed shape or a protrusion shape in which the backband and the frame material or the panel and the frame material form an integrated structure.

A light source of the display device provided in the inside of the electronic device is configured by a device emitting white light, such as a light-emitting diode, an organic EL, or CCFL. In addition, there is a device including a light-emitting element that emits white light or the like instead of using the light source, such as an organic EL display. The leakage of the white light outside the device through the chemically-strengthened glass deteriorates the visual qualities. Therefore, the chemically-strengthened glass preferably has a characteristic of reliably shielding white light.

The chemically-strengthened glass of the present invention has a characteristic of being excellent in mechanical strength and the like. Therefore, the chemically-strengthened glass is preferably used for a phase-separated glass chassis for portable electronic devices such as mobile phones which is required to have a high strength.

The chemically-strengthened glass of the present invention appears to be white due to the diffusion, reflection and scattering of light by the particles of dispersed phases in the glass. The chemically-strengthened glass obtained through the production method of the present invention makes the white light passing through the glass opaque by utilizing the light scattering in the glass and difficult to be recognized on the front surface side of the glass.

The phase-separated glass or chemically-strengthened glass of the present invention having a high strength and aesthetic appearance can also be applied to electronic devices other than portable electronic devices (e.g., the chassis of desk top computers), home electric appliances (e.g., large-size televisions), construction members, in-vehicle members, dishes, lighting members (e.g., scattering plates), reflection members, furniture, and the like.

EXAMPLES

Hereinafter, examples of the present invention will be specifically described, but the present invention is not limited thereto.

<Production of Glass>

In the present example, glass having glass compositions 1 to 3 described below were used. Whether or not phase-separated particles grew was measured by a method of checking by a SEM. The components were uniformly dissolved at 1,600° C., held at a certain temperature of 1,600° C. or lower for 30 minutes and then, rapidly cooled, and whether or not the temperature was the phase separation temperature or lower was determined on the basis of whether or not the phase-separated particles grew. The sizes of the phase-separated particles were observed by using a scanning electron microscope (SEM). The holding temperature was changed at intervals of 10° C., in a temperature range of 1,600° C. or lower, whether or not the phase-separated particles grew was checked, and the phase separation initiation temperature was obtained.

Glass composition 1: Glass containing, in terms of mole %, 61.4% of $SiO_2$, 3.4% of $Al_2O_3$, 0.9% of $B_2O_3$, 15.4% of MgO, 4.3% of $ZrO_2$, 9.4% of $Na_2O$, and 5.1% of $P_2O_5$. The glass had a phase separation initiation temperature of 1,530° C. and a temperature at which the viscosity reaches $10^5$ dPa·s was 1,150° C.

Glass composition 2: Glass containing, in terms of mole %, 62.5% of $SiO_2$, 3.5% of $Al_2O_3$, 0.9% of $B_2O_3$, 15.7% of MgO, 2.6% of $ZrO_2$, 9.6% of $Na_2O$, and 5.2% of $P_2O_5$. The glass had a phase separation initiation temperature of 1,570° C.

Glass composition 3: Glass containing, in terms of mole %, 60.7% of $SiO_2$, 3.4% of $Al_2O_3$, 3.9% of $B_2O_3$, 7.6% of MgO, 2.5% of $ZrO_2$, 9.3% of $Na_2O$, 5.1% of $P_2O_5$, and 7.6% of BaO. The glass had a phase separation initiation temperature of 1,400° C.

Example 1

Into a platinum crucible was put 15 g of batch prepared according to the glass composition 1, followed by melting at 1,550° C. for 20 minutes, then, the temperature inside a furnace was lowered to 1,400° C. at a rate of 25° C./min, and the batch was removed from the furnace, that is, was taken out to room temperature and naturally cooled. After that, the batch was again heated and held at 670° C. for 1 hour with an intention of annealing, and then, cooled to room temperature at 1° C./min, followed by polishing, to thereby obtain plate-shaped glass. In the step of lowering the temperature to 1,400° C., a part carried out at the phase separation initiation temperature (=1,530° C.) or lower corresponds to a phase separation step and the holding time of the glass in this step is 5.2 minutes [=(1530−1400)÷25].

Meanwhile, since mirabilite was added to the batch for the purpose of fining, the obtained glass contains $SO_3$. Regarding the amount of the mirabilite added, $SO_3$ was made to be contained at a fraction of 0.4 parts by mass in 100 parts by mass of the glass excluding $SO_3$. This shall apply to Examples and Comparative examples below as well.

Example 2

Into a platinum crucible was put 15 g of batch prepared according to the glass composition 1, followed by melting at 1,550° C. for 20 minutes, then, the temperature inside a furnace was lowered to 1,400° C., and the batch was held at the phase separation initiation temperature or lower for 15 minutes, removed from the furnace and naturally cooled. After that, the batch was held at 670° C. for 1 hour, and then, annealed to room temperature at 1° C./min, followed by polishing, to thereby obtain plate-shaped glass. The dispersed phase of the obtained plate-shaped glass was an alkali-rich phase.

Example 3

Into a platinum crucible was put 15 g of batch prepared according to the glass composition 1, followed by melting at 1,550° C. for 20 minutes, then, the temperature inside a furnace was lowered to 1,400° C., and the batch was held at the phase separation initiation temperature or lower for 85 minutes, removed from the furnace and naturally cooled. After that, the batch was held at 670° C. for 1 hour, and then, annealed to room temperature at 1° C./min, followed by polishing, to thereby obtain plate-shaped glass. The dispersed phase of the obtained plate-shaped glass was not a silica-rich phase but an alkali-rich phase.

Example 4

Into a platinum crucible was put 15 g of batch prepared according to the glass composition 1, followed by melting at 1,550° C. for 20 minutes, then, the temperature inside a furnace was lowered to 1,350° C. and the batch was held at the phase separation initiation temperature or lower for 17 minutes, removed from the furnace and naturally cooled. After that, the batch was held at 670° C. for 1 hour, and then, annealed to room temperature at 1° C./min, followed by polishing, to thereby obtain plate-shaped glass.

Example 5

Into a platinum crucible was put 15 g of batch prepared according to the glass composition 2, followed by melting at 1,600° C. for 20 minutes, then, the temperature inside a furnace was lowered to 1,420° C., the batch was held at the phase separation initiation temperature or lower for 68 minutes, removed from the furnace and naturally cooled. After that, the batch was held at 640° C. for 1 hour, and then, annealed to room temperature at 1° C./min followed by polishing, to thereby obtain plate-shaped glass.

Example 6

Into a platinum crucible was put 400 g of batch prepared according to the glass composition 1, followed by melting at 1,550° C. for 120 minutes, then, the temperature inside a furnace was lowered to 1,400° C., and the batch was held at the phase separation initiation temperature or lower for 85 minutes. The glass melt was stirred during the step of dissolving the batch at 1,550° C., the step of lowering the temperature from 1,550° C. to 1,400° C. and the step of holding the melt at 1,400° C., the melt was made to flow on a carbon plate. After that, the melt was put into an electric furnace at 670° C., held for 1 hour, and then, annealed to room temperature at 1° C./min, followed by polishing, to thereby obtain plate-shaped glass.

Example 7

Into a platinum crucible was put 15 g of batch prepared according to the glass composition 3, followed by melting at 1,600° C. for 20 minutes, then, the temperature inside a furnace was lowered to 1,240° C. at a rate of 10° C./minute, and the batch was removed from the furnace at 1,240° C. and naturally cooled. After that, the batch was held at 670° C. for 1 hour, and then, annealed to room temperature at 1° C./min, followed by polishing, to thereby obtain plate-shaped glass.

Example 8

Into a platinum crucible was put 15 g of batch prepared according to the glass composition 3, followed by melting at 1,600° C. for 20 minutes, then, the temperature inside a furnace was lowered to 1,240° C. at a rate of 25° C./minute, and the batch was removed from the furnace at 1,240° C. and naturally cooled. After that, the batch was held at 670° C. for 1 hour, and then, annealed to room temperature at 1° C./min, followed by polishing, to thereby obtain plate-shaped glass.

Example 9

Into a platinum crucible was put 15 g of batch prepared according to the glass composition 3, followed by melting at 1,600° C. for 20 minutes, then, the temperature inside a furnace was lowered to 1,390° C. at a rate of 25° C./minute, and the batch was held at 1,390° C. for 80 minutes, removed from the furnace at 1,390° C. and naturally cooled. After that, the batch was held at 670° C. for 1 hour, and then, annealed to room temperature at 1° C./min, followed by polishing, to thereby obtain plate-shaped glass.

Example 10

Into a platinum crucible was put 15 g of batch prepared according to the glass composition 3, followed by melting at 1,600° C. for 20 minutes, then, the temperature inside a furnace was lowered to 1,360° C. at a rate of 25° C./minute, and the batch was held at 1,360° C. for 80 minutes, removed from the furnace at 1,360° C. and naturally cooled. After that, the batch was held at 670° C. for 1 hour, and then, annealed to room temperature at 1° C./min, followed by polishing, to thereby obtain plate-shaped glass.

Example 11

Into a platinum crucible was put 15 g of batch prepared according to the glass composition 3, followed by melting at 1,600° C. for 20 minutes, then, the temperature inside a furnace was lowered to 1,330° C. at a rate of 25° C./minute, the batch was held at 1,330° C. for 80 minutes, removed from the furnace at 1,330° C. and naturally cooled. After that, the batch was held at 670° C. for 1 hour, and then, annealed to room temperature at 1° C./min, followed by polishing, to thereby obtain plate-shaped glass.

Example 12

Into a platinum crucible was put 15 g of batch prepared according to the glass composition 3, followed by melting at 1,600° C. for 20 minutes, then, the temperature inside a furnace was lowered to 1,300° C. at a rate of 25° C./minute, and the batch was held at 1,300° C. for 80 minutes, removed from the furnace at 1,300° C. and naturally cooled. After that, the batch was held at 670° C. for 1 hour, and then, annealed to room temperature at 1° C./min, followed by polishing, to thereby obtain plate-shaped glass.

Example 13

Into a platinum crucible was put 15 g of batch prepared according to the glass composition 3, followed by melting at 1,600° C. for 20 minutes, then, the temperature inside a furnace was lowered to 1,270° C. at a rate of 25° C./minute, and the batch was held at 1,270° C. for 80 minutes, removed from the furnace at 1,270° C. and naturally cooled. After that, the batch was held at 670° C. for 1 hour, and then, annealed to room temperature at 1° C./min, followed by polishing, to thereby obtain plate-shaped glass.

Example 14

Into a platinum crucible was put 15 g of batch prepared according to the glass composition 3, followed by melting at 1,600° C. for 20 minutes, then, the temperature inside a furnace was lowered to 1,240° C. at a rate of 25° C./minute, the batch was held at 1,240° C. for 80 minutes, removed from the furnace at 1,240° C. and naturally cooled. After that, the batch was held at 670° C. for 1 hour, and then, annealed to room temperature at 1° C./min, followed by polishing, to thereby obtain plate-shaped glass.

Comparative Example 1

Into a platinum crucible was put 15 g of batch prepared according to the glass composition 1, followed by melting at 1,550° C. for 120 minutes, and then, the batch was taken to room temperature and naturally cooled. After that, the batch was held at 670° C. for 1 hour, and then, annealed to room temperature at 1° C./min, followed by polishing, to thereby obtain plate-shaped glass.

Comparative Example 2

Into a platinum crucible was put 400 g of batch prepared according to the glass composition 1, followed by melting at 1,550° C. for 120 minutes, and then, the batch was made to flow into a mold, naturally cooled to be shaped, then, subjected to a phase separation treatment at 900° C. for 6 hours, and annealed to room temperature at 1° C./min, followed by polishing, to thereby obtain plate-shaped glass. The dispersed phase of the obtained plate-shaped glass was an alkali-rich phase.

Comparative Example 3

Into a platinum crucible was put 400 g of batch prepared according to the glass composition 1, followed by melting at 1,550° C. for 120 minutes, and then, the batch was made to flow into a mold, naturally cooled to be shaped, then, subjected to a phase separation treatment at 950° C. for 6 hours, and annealed to room temperature at 1° C./min, followed by polishing, to thereby obtain plate-shaped glass. The dispersed phase of the obtained plate-shaped glass was an alkali-rich phase.

In Comparative Examples 1 to 3, color unevenness was observed.

Comparative Example 4

Into a platinum crucible was put 400 g of batch prepared according to the glass composition 3, followed by melting at 1,600° C. for 120 minutes, the batch was made to flow into a mold, naturally cooled to be shaped, held at 670° C. for 1 hour, and annealed to room temperature at 1° C./min, followed by polishing, to thereby obtain plate-shaped glass.

Comparative Example 5

Into a platinum crucible was put 400 g of batch prepared according to the glass composition 3, followed by melting at 1,600° C. for 120 minutes, then, the batch was made to flow into a mold, naturally cooled to be shaped, then, subjected to a phase separation treatment at 900° C. for 6 hours, and annealed to room temperature at 1° C./min, followed by polishing, to thereby obtain plate-shaped glass.

<Ion Exchange Treatment>

Next, the samples of Examples 1 to 5 and Comparative Examples 1 to 3 were chemically strengthened through an ion exchange treatment by immersing the samples in a molten salt of 100% $KNO_3$ at 450° C. for 6 hours.

<Analysis Method>

The plate-shaped glass obtained in Examples 1 to 5 and Comparative Examples 1 to 3 was analyzed by the following methods (1) to (4). The results are described in Table 1, Table 2 and FIG. 1.

(1) Phase Separation Mechanism

The phase separation mechanism of the plate-shaped glass was observed by an SEM and, the case in which one phase of separated phases is spherical was determined to be in a binodal state and, the case in which the separated phases are entangled with each other was determined to be in a spinodal state.

(2) Average Particle Size

In Examples 2, 3, and 5 and Comparative Examples 1 to 3, the glass surfaces were optically polished, then, immersed in an aqueous solution of 0.1 M hydrochloric acid, held at 60° C. for 1 hour, particle phases were etched, and then an observation by a scanning electron microscope (SEM) was performed. Since the particle phases are preferentially etched and form recessed shapes, it is possible to measure the particle size.

In Examples 7 to 14 and Comparative Examples 4 and 5, since the electron density difference between the particle phase and the matrix phase is large, the contrast between the particle phase and the matrix phase is strong in the SEM observation. Therefore, after optical polishing, the particle size was measured by SEM with no etching.

In the case in which the particle size was less than 100 nm, since the particle phases made only little contribution to the transmittance against wavelengths of 400 nm or more and thus, in the respective examples, particle size of 100 nm or more were measured, the average value thereof was represented by dA, the average value of the extracted 10% largest thereof was represented by dL, and the average value of the 10% smallest thereof was represented by dS.

(3) Volume Ratio of Particles (%)

The ratio of dispersed particles distributed on the glass surface was computed from a photograph observed by a SEM and the volume ratio of the particles in the dispersed phase was computed from the ratio of the dispersed particles.

(4) Transmittance (%)

For the transmittance of the glass, the spectral transmittances at wavelengths of 400 nm, 600 nm, 800 nm, and 1000 nm were obtained by using 1 mm-thick glass having mirror-worked top and bottom surfaces.

(5) Surface Compressive Stress Value (CS) and Compressive Stress Layer Depth (DOL)

The surface compressive stress value (CS, the unit was MPa) and the depth of the compressive stress layer (DOL, the unit was μm) were measured by using a surface stress meter (FSM-6000) manufactured by Orihara Industrial Co., Ltd.)

TABLE 1

| | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Removal temperature [° C.] | 1,400 | 1,400 | 1,400 | 1,350 | 1,420 | 1,400 | 1,550 | 1,550 | 1,550 |
| Time of phase separation step before shaping [minutes] | 5 | 15 | 85 | 17 | 68 | 85 | 0 | 0 | 0 |
| Phase separation thermal treatment after shaping | None | None | None | None | None | None | None | 900° C. 6 hours | 950° C. 6 hours |
| Phase separation mechanism | — | Binodal | Binodal | — | Binodal | — | Binodal | Binodal | Binodal |
| Average particle size (dA) [μm] | — | 0.26 | 0.28 | — | 0.30 | — | 0.17 | 0.19 | 0.19 |
| Particle volume ratio [%] | — | 16 | 16 | — | 14 | — | — | — | — |
| Transmittance [%] (wavelength 1,000 nm) | 9.54 | 1.91 | 0.50 | 1.99 | 0.42 | 0.50 | 82.78 | 62.79 | 55.04 |
| Transmittance [%] (wavelength 800 nm) | 1.68 | 0.54 | 0.48 | 0.58 | 0.49 | 0.48 | 53.62 | 28.00 | 23.48 |
| Transmittance [%] (wavelength 600 nm) | 0.44 | 0.43 | 0.44 | 0.45 | 0.45 | 0.44 | 11.78 | 6.68 | 5.32 |
| Transmittance [%] (wavelength 400 nm) | 0.39 | 0.40 | 0.42 | 0.41 | 0.41 | 0.42 | 0.56 | 0.40 | 0.39 |
| Tmax/Tmin (400 nm to 800 nm) | 4.31 | 1.35 | 1.14 | 1.41 | 1.20 | 1.20 | 95.75 | 70.00 | 60.21 |
| CS [Mpa] | 682 | 674 | — | 685 | — | — | 701 | 692 | 690 |
| DOL [μm] | 23 | 20 | — | 21 | — | — | 21 | 21 | 22 |
| dL [μm] | — | 0.78 | 1.00 | — | 0.52 | — | 0.23 | — | — |
| dS [μm] | — | 0.11 | 0.14 | — | 0.15 | — | 0.11 | — | — |
| dL/dA | — | 3.00 | 3.56 | — | 1.73 | — | 1.38 | — | — |
| dS/dA | — | 0.43 | 0.49 | — | 0.49 | — | 0.69 | — | — |
| (dL-dS)/dA | — | 2.57 | 3.07 | — | 1.24 | — | 0.69 | — | — |

TABLE 2

|  | Ex. 7 | Ex. 8 | Ex. 9 | Ex. 10 | Ex. 11 | Ex. 12 | Ex. 13 | Ex. 14 | Comp. Ex. 4 | Comp. Ex. 5 |
|---|---|---|---|---|---|---|---|---|---|---|
| Removal temperature [° C.] | 1,240 | 1,240 | 1,390 | 1,360 | 1,330 | 1,300 | 1,270 | 1,240 | 1,600 | 1,600 |
| Time of phase separation step before shaping [minutes] | 36 | 14 | 88 | 90 | 91 | 92 | 93 | 94 | 0 | 0 |
| Phase separation thermal treatment after shaping | None | None | None | None | None | None | None | None | None | 900° C. 6 hours |
| Phase separation mechanism | Binodal | Binodal | Binodal | Binodal | Binodal | Binodal | Binodal | Binodal | Binodal | Binodal |
| Average particle size (dA) [μm] | 0.67 | 0.51 | 0.22 | 0.28 | 0.25 | 0.70 | 0.77 | 0.68 | 0.20 | 0.19 |
| Particle volume ratio [%] | 17 | 18 | 14 | 18 | 17 | 13 | 16 | 15 | — | — |
| Transmittance [%] (wavelength 1,000 nm) | 0.28 | 0.27 | 0.31 | 0.27 | 0.33 | 0.32 | 0.30 | 0.28 | 20.05 | 4.63 |
| Transmittance [%] (wavelength 800 nm) | 0.32 | 0.30 | 0.32 | 0.27 | 0.34 | 0.35 | 0.34 | 0.32 | 1.20 | 0.34 |
| Transmittance [%] (wavelength 600 nm) | 0.28 | 0.26 | 0.25 | 0.23 | 0.27 | 0.30 | 0.29 | 0.28 | 0.21 | 0.21 |
| Transmittance [%] (wavelength 400 nm) | 0.22 | 0.20 | 0.20 | 0.17 | 0.22 | 0.22 | 0.23 | 0.23 | 0.15 | 0.15 |
| Tmax/Tmin (400 nm to 800 nm) | 1.42 | 1.46 | 1.56 | 1.61 | 1.56 | 1.59 | 1.51 | 1.40 | 7.97 | 2.29 |
| dL [μm] | 1.03 | 0.78 | 0.45 | 0.94 | 1.14 | 1.34 | 1.24 | 1.08 | 0.31 | 0.28 |
| dS [μm] | 0.25 | 0.19 | 0.12 | 0.14 | 0.10 | 0.10 | 0.22 | 0.22 | 0.12 | 0.11 |
| dL/dA | 1.54 | 1.53 | 2.01 | 3.34 | 4.58 | 1.92 | 1.62 | 1.59 | 1.50 | 1.47 |
| dS/dA | 0.37 | 0.38 | 0.54 | 0.50 | 0.42 | 0.15 | 0.29 | 0.33 | 0.57 | 0.58 |
| (dL-dS)/dA | 1.17 | 1.15 | 1.47 | 2.83 | 4.17 | 1.77 | 1.33 | 1.26 | 0.93 | 0.89 |

Figure 1:
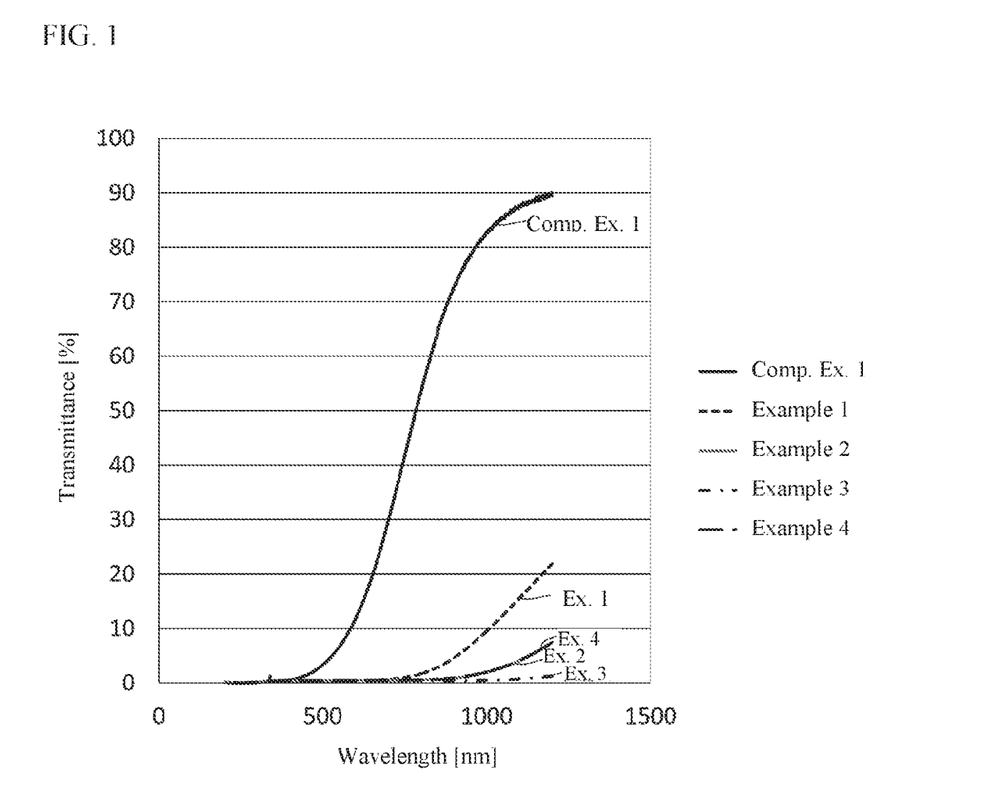
FIG. 1 is a view showing transmittance of glass of Examples 1 to 4 and Comparative Example 1.

As described in Table 1 and Table 2 and illustrated in FIG. 1, in the glass plates of Examples 1 to 14 produced by being subjected to the phase separation step of separating phases in the glass between the melting step of melting the glass and the shaping step of shaping the glass, as compared with Comparative Examples 1 and 4 in which the phase separation treatment was not carried out and Comparative Examples 2, 3, and 5 in which the phase separation treatment was carried out after the shaping step, the transmittances were significantly decreased. In addition, uniformly white glass was obtained in all of Examples 1 to 14.

From these results, it was found that, when phase-separated glass is produced through the production method sequentially including the melting step of melting the glass, the phase separation step of separating phases in the glass, and the shaping step of shaping the glass, it is possible to effectively reduce the transmittance of the obtained phase-separated glass.

In addition, as described in Table 1 and Table 2, in Examples 1 to 4 and 6, as compared with Comparative Examples 1 to 3, the transmittances were low at all wavelengths of a wavelength of 1,000 nm, a wavelength of 800 nm, a wavelength of 600 nm, and a wavelength of 400 nm. In addition, in Examples 7 to 14, as compared with Comparative Examples 4 and 5, the transmittances were low at all wavelengths of a wavelength of 1,000 nm, a wavelength of 800 nm, a wavelength of 600 nm, and a wavelength of 400 nm. From these results, it was found that the phase-separated glass of the present invention can produce as white glass having excellent shielding properties.

Furthermore, as described in Table 1 and Table 2, in Examples 1 to 14, as compared with Comparative Examples 1 to 5, the transmittances of Tmax/Tmin were low. From these results, it was found that, when phase-separated glass is produced through the production method of the present invention, the obtained phase-separated glass is not easily hued.

The present invention has been described in detail with reference to specific embodiments but it is obvious to a person skilled in the art that a variety of variations and modifications are permitted without departing from the intention and scope of the present invention. Meanwhile, the present application is based on Japanese Patent Application (Japanese Patent Application No. 2012-226854) filed on Oct. 12, 2012, the content of which is incorporated herein by reference.

The invention claimed is:

1. A phase-separated glass, having a structure satisfying Equation (1):

$$(dL-dS)/dA \geq 1.0 \quad (1),$$

where, for particles having a diameter of 100 nm or more generated by phase separation, dA represents an average particle diameter of all the particles, dL represents an average particle diameter of largest 10% by number of all the particles, and dS represents an average particle diameter of smallest 10% by number of all the particles.

2. The phase-separated glass according to claim 1, wherein dA is more than 0.2 μm.

3. The phase-separated glass according to claim 1, wherein the glass is an alkali silicate glass and comprises a total of 6% by mass or more of $Na_2O$ and $K_2O$, and 0.5% by mass or more of $P_2O_5$.

4. The phase-separated glass according to claim 1, wherein the glass comprises at least one of CaO and BaO and a total content of CaO and BaO is less than 6% by mass.

5. The phase-separated glass according to claim 1, comprising, in terms of an oxide-based mole percentage, $SiO_2$ in a range of 50% to 80%, $Al_2O_3$ in a range of 0% to 10%, $B_2O_3$ in a range of 0% to 7%, MgO in a range of 2% to 30%, at least one selected from $ZrO_2$, $P_2O_5$, $TiO_2$, and $La_2O_3$ in a range of 0.5% to 10% in total, and $Na_2O$ in a range of 1% to 17%.

6. The phase-separated glass according to claim 1, comprising, in terms of an oxide-based mole percentage, $SiO_2$ in a range of 50% to 80%, $Al_2O_3$ in a range of 0% to 10%, $B_2O_3$ in a range of 0% to 4%, MgO in a range of 5% to 30%, at least one selected from $ZrO_2$, $P_2O_5$, $TiO_2$, and $La_2O_3$ in a range of 0.5% to 10% in total, and $Na_2O$ in a range of 1% to 17%.

7. The phase-separated glass according to claim 1, wherein a light transmittance at a thickness of 1 mm and at each wavelength of a wavelength of 800 nm, a wavelength of 600 nm, and a wavelength of 400 nm is 50% or less.

8. The phase-separated glass according to claim 1, wherein a light transmittance at a thickness of 1 mm and at a wavelength of 1,000 nm is 50% or less.

9. The phase-separated glass according to claim 1, wherein a ratio of a maximum value Tmax to a minimum value Tmin of a light transmittance at a thickness of 1 mm and at a wavelength in a range of 800 nm to 400 nm is 50 or less.

10. A chemically-strengthened glass, obtained by a process comprising:
carrying out an ion exchange treatment on the phase-separated glass according to claim 1.

11. An electronic device chassis, comprising:
the phase-separated glass according to claim 1.

12. An electronic device chassis, comprising:
the chemically-strengthened glass according to claim 10.

* * * * *